United States Patent
Venus et al.

(10) Patent No.: US 8,423,823 B2
(45) Date of Patent: Apr. 16, 2013

(54) COMMUNICATIONS ARCHITECTURE FOR PROVIDING DATA COMMUNICATION, SYNCHRONIZATION AND FAULT DETECTION BETWEEN ISOLATED MODULES

(75) Inventors: Brian Venus, Pittsburgh, PA (US); Nicholas D. Benavides, Allison Park, PA (US)

(73) Assignee: GE Energy Power Conversion Technology Limited, Warwickshire (GB)

( * ) Notice: Subject to any disclaimer, the term of this patent is extended or adjusted under 35 U.S.C. 154(b) by 0 days.

(21) Appl. No.: 13/329,789

(22) Filed: Dec. 19, 2011

(65) Prior Publication Data
US 2012/0166695 A1 Jun. 28, 2012

Related U.S. Application Data

(60) Provisional application No. 61/426,081, filed on Dec. 22, 2010.

(51) Int. Cl.
*G06F 11/00* (2006.01)
(52) U.S. Cl.
USPC ............ 714/13; 714/37; 712/31; 713/330; 713/340
(58) Field of Classification Search .......... None
See application file for complete search history.

(56) References Cited

U.S. PATENT DOCUMENTS

| | | | |
|---|---|---|---|
| 5,379,325 A * | 1/1995 | Katayama et al. | 375/354 |
| 5,428,754 A | 6/1995 | Baldwin | |
| 6,975,655 B2 * | 12/2005 | Fischer et al. | 370/516 |
| 2002/0183092 A1 | 12/2002 | Suzuki et al. | |
| 2008/0071879 A1 * | 3/2008 | Park | 709/208 |
| 2008/0155318 A1 * | 6/2008 | Shelvik et al. | 714/12 |
| 2010/0090876 A1 | 4/2010 | Taft et al. | |
| 2010/0131801 A1 * | 5/2010 | Baleani et al. | 714/37 |
| 2010/0169752 A1 | 7/2010 | Kuenemund | |
| 2010/0199009 A1 * | 8/2010 | Koide | 710/110 |
| 2012/0243559 A1 * | 9/2012 | Pan et al. | 370/503 |

* cited by examiner

*Primary Examiner* — Christopher McCarthy
(74) *Attorney, Agent, or Firm* — Eckert Seamans Cherin & Mellott, LLC; Philip E. Levy (57) ABSTRACT

An electronic system includes a master module having a first control unit having one or more first serial interfaces and being programmed to output a first data signal and a first clock signal through the one or more first serial interfaces, and a slave module having a second control unit, the second control unit having a second serial interface. The slave module receives the first clock signal through the second serial interface, and the second control unit is programmed to monitor the slave module for a fault condition and output a second clock signal through the second serial interface which is (i) the same as the first clock signal if a fault condition on the slave module is not detected, and (ii) a modified clock signal having a predetermined format through the second serial interface if a fault condition on the slave module is detected.

49 Claims, 9 Drawing Sheets

COMMUNICATIONS ARCHITECTURE FOR PROVIDING DATA COMMUNICATION, SYNCHRONIZATION AND FAULT DETECTION BETWEEN ISOLATED MODULES

CROSS-REFERENCE TO RELATED APPLICATIONS

This application claims priority under 35 U.S.C. §119(e) from provisional U.S. patent application Ser. No. 61/426,081, entitled "Communication Architecture for Multilevel Power Converter" and filed on Dec. 22, 2010, the contents of which are incorporated herein by reference.

BACKGROUND OF THE INVENTION

1. Field of the Invention

The present invention pertains to an electronic system (such as, without limitation, a multilevel power inverter or an active front end) that employs multiple modules (wherein each module may include one or more printed circuit boards (PCBs) and/or other electronic components), and, in particular, to a communications architecture for providing data communication, synchronization and fault detection between isolated modules in such an electronic system.

2. Description of the Related Art

A number of different power conversion modules/systems are well known for converting power from one form to another. For example, a multilevel power inverter is a power electronic device that is structured to produce AC waveforms from a DC input voltage. As another example, an active front end (also called a controllable rectifier) is a power electronic device wherein AC waveforms are converted to DC voltages. Such power conversion modules/system are used in a wide variety of applications, such as, without limitation, variable speed motor drives, and frequently require highly synchronized timing across communication links of the system and/or fast fault response between links in the system.

Many current industrial electronic systems employ asynchronous data communications (wherein no serial clock (SCLK) is employed) and require specialized physical interfaces and topologies. These asynchronous topologies require one of the following solutions to provide synchronization: (i) timestamp messages, which require dedicated hardware and processing time, or (ii) a completely separate communication line used solely for synchronization (which adds additional connections such as additional optical fibers).

Many current systems utilize the timestamp method to keep synchronization. A case example is the IEEE 1588 specification which allows synchronization across Ethernet networks. The standard requires that specialized timestamp hardware be included in each node's Ethernet system. Additionally, a central hub/switch must also be added to the system to meet the standard Ethernet star topology. While only two optical fibers would be needed for each module to implement such a system, the central hub/switch would also need two optical fibers. Unfortunately, fiber optic Ethernet hubs/switches are not as common or cost effective as their copper counterparts. Additional downsides include sacrificing some of the communication bandwidth to provide time for the synchronization messages to be broadcast.

In addition, the well known EtherCAT® system is a variant of the IEEE 1588 specification where the synchronization is done entirely in hardware, and a ring topology is used instead of a star. No switches are required, but each module must have two datapaths to provide round trip information, which is needed for the synchronization. These two data paths require four fiber transceivers per module (2 Rx/Tx pairs). Also, the required EtherCAT® hardware interface integrated circuit (IC) adds additional cost and integration effort.

None of the standard communication solutions appears to provide a dedicated way to flag a fault quickly without sending a specific data message (note that sending a fault data message is not desirable as the message must be fully received and decoded before fault actions can occur, leading to relatively slow detection performance). The common way to provide a fast fault line has been to provide a dedicated healthy line that any node on the system can pull down when a problem is detected. The problem with such a system is that it requires an additional fiber interface that is not part of the actual communication scheme.

Thus, there is a need for a communication architecture that provides an efficient way to communicate data and synchronization information that may be employed in an electronic system such as, without limitation, a power conversion module/system (e.g., a multilevel power inverter or an active front end).

SUMMARY OF THE INVENTION

In one embodiment, an electronic system, such as, without limitation, a multilevel power inverter forming part of a motor drive, is provided. The system includes a master module having a first control unit, the first control unit having one or more first serial interfaces (e.g., SPI interfaces), the first control unit being programmed to output a first data signal and a first clock signal through the one or more first serial interfaces, and a slave module having a second control unit, the second control unit having a second serial interface (e.g., an SPI interface). The slave module receives the first clock signal through the second serial interface, and the second control unit is programmed to monitor the slave module for a fault condition and output a second clock signal through the second serial interface which is (i) the same as the first clock signal if a fault condition on the slave module is not detected, and (ii) a modified clock signal having a predetermined format if a fault condition on the slave module is detected.

In another embodiment, a method of providing synchronization information and fault detection information in an electronic system is provided. The method includes generating a first data signal and a first clock signal in a master module of the electronic system, the master module having one or more first serial interfaces, and outputting the first data signal and the first clock signal from the master module through the one or more first serial interfaces. The method further includes receiving the first clock signal through a second serial interface of a slave module of the electronic system, and monitoring the slave module for a fault condition on the slave module. Finally, the method includes, responsive to receiving the clock signal in the slave module, outputting a second clock signal through the second serial interface to either the master module or an additional slave module of the electronic system which is (i) the same as the first clock signal if a fault condition on the slave module is not detected, and (ii) a modified clock signal having a predetermined format if a fault condition on the slave module is detected.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION OF EXEMPLARY EMBODIMENTS

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The present invention, in the exemplary embodiment, provides a communications architecture that may be used for module to module communications in an electronic system (wherein each module may include, for example and without limitation, one or more printed circuit boards (PCBs) and/or other electronic components). In one particular, non-limiting embodiment, the architecture is employed in a multilevel power inverter implemented using multiple modules. For example, and without limitation, U.S. Provisional Application No. 61/426,051, filed on Dec. 22, 2010, and U.S. Provisional Application No. 61/501,876, filed on Jun. 28, 2011, each owned by the assignee of the present invention and entitled "Mechanical Arrangement of a Multilevel Power Converter Circuit," describe particular alternative mechanical arrangements for a multilevel power inverter, and it will be understood that the communications architecture described herein may be employed with such multilevel power inverter arrangements. The disclosures of U.S. Provisional Application Nos. 61/426,051 and 61/501,876, and U.S. patent application Ser. No. 13/329,422, filed on the same date herewith and claiming priority under 35 U.S.C. §119(e) to the provisional applications just identified, are incorporated herein by reference in their entirety. A number of other topologies for implementing a multilevel power inverter are also well known, including the neutral point clamped (NPC) topology, the flying capacitor (FC) topology and the H-bridge topology, and it will be understood that the communications architecture described herein may be employed with any of such topologies, or any other known or hereafter developed topology that may be used to implement a multilevel power inverter. In another particular, non-limiting embodiment, the architecture is employed in an active front end implemented using multiple modules that each may include, for example and without limitation, one or more PCBs and/or other electronic components.

The communications architecture described herein is, in the exemplary embodiment, an enhancement of the widely known standard serial peripheral interface (SPI) synchronous protocol, which requires both a system clock signal (SCLK) and a data signal to be transmitted together. In the exemplary embodiment, and as described in greater detail herein, the communications links are formed using fiber optic media and the clock signal is used for multiple purposes, namely for both system synchronization and fast fault detection.

Furthermore, in the communications architecture described herein, the modules are set up in a single master, multiple slave arrangement as a broadcast domain. This allows the SPI to eliminate the NSS (slave select) signal, thereby saving a fiber and reducing complexity (NSS can be pulled up with hardware, or disabled within the software). In the exemplary embodiment, shown in FIG. 1 and described in detail herein, the modules are arranged in a daisy chain topology (although other topologies, such as a star or star and daisy chain topology, are also possible and are described elsewhere herein as alternatives) wherein each module acts as a fiber repeater, and wherein the received optical signals are converted to electrical signals. The electrical signals are monitored by a microcontroller and retransmitted to the next module in the chain as optical signals. This creates a simple broadcast domain, but at the cost of propagation delay from the optical to electrical conversions. As described in greater detail herein, each slave module will have a microcontroller and an SPI with supporting circuitry for receiving the SCLK and data signals (ClkIn and DataIn) and for transmitting the SCLK and data signals (ClkOut and DataOut). Also, the SPI will have associated with it two RX optical to electrical converters for converting the received optical ClkIn and DataIn signals to electrical signals and two TX electrical to optical converters for converting electrical ClkOut and DataOut signals on the module to optical signals that may be transmitted to the next module over the fiber link. The microcontroller on each module has the ability to add feedback data to the DataOut signal.

In addition, by using a discontinuous SPI communication scheme in the communications architecture, the SCLK signal is used for both synchronization and fault detection communication. In particular, in one exemplary implementation, discontinuous SPI stops transmitting the SCLK oscillating signal for short amounts of time between messages. This will appear as a logic low gap in the SCLK signal which can be detected by the modules. Furthermore, the microcontroller is programmed to, in the event that a fault condition is detected on the module, pull the SCLK signal high and transmit that logic high signal rather than the SCLK signal it received to indicate a fault to the other modules. Each module will continuously monitor the SCLK signal and look for gaps in the oscillating signal. If a gap is detected, the logic level is measured to determine whether the gap is a synch signal or a fault signal. It will be understood that the logic high vs. logic low gap assignments (sync vs. fault) in a discontinuous SPI communication scheme can be arbitrary as long as the entire system is consistent in their use. In other words, in an alternative implementation of a discontinuous SPI communication scheme, logic high may be used for synch and logic low may be used for fault. For illustrative purposes, in the exemplary embodiments described herein, the former implementation (logic low for synch and logic high for fault) is used, but this is not mean to be limiting.

Figure 1:
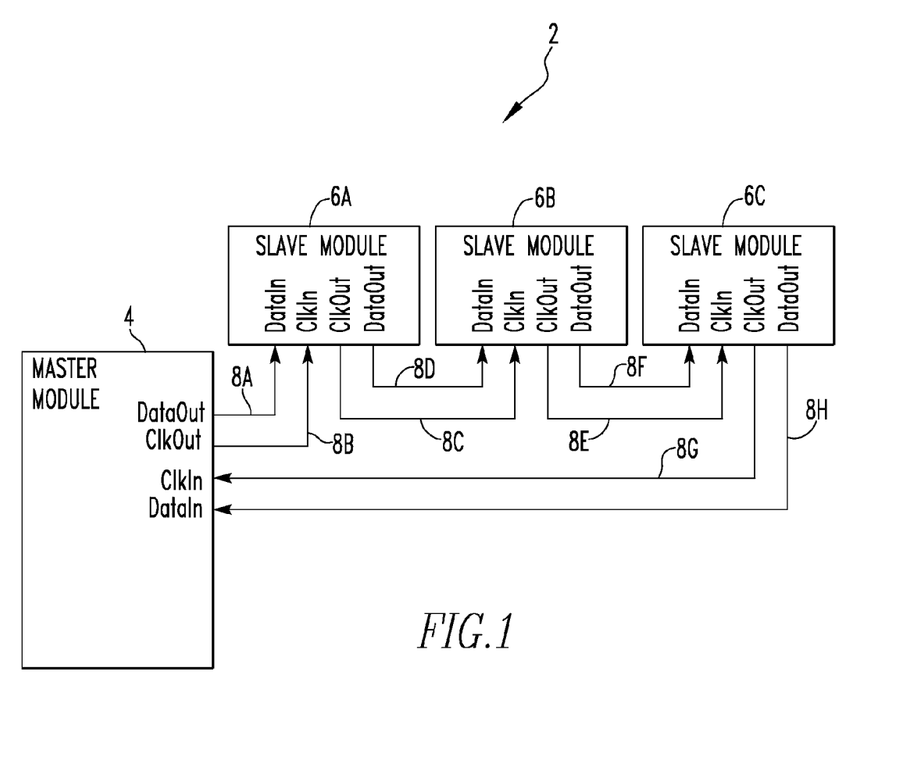
FIG. 1 is a schematic diagram of an electronic system that implements a communications architecture of the present invention according to one particular, non-limiting exemplary embodiment.

FIG. 1 is a schematic diagram of an electronic system 2 that implements the communications architecture of the present invention according to one particular, non-limiting exemplary embodiment. As seen in FIG. 1, electronic system 2 includes a master module 4 and a number of slave modules 6 arranged in a daisy chain configuration. Master module 4 and slave modules 6 are each described in detail below. In the illustrated, exemplary embodiment, electronic system 2 includes three slave modules 6, labeled 6A, 6B, and 6C. It will be understood, however, that this is meant to be exemplary only, and that electronic system 2 may include one, two or four or more slave modules 6 within the scope of the present invention.

Master module 4 and slave modules 6A, 6B, and 6C are configured to communicate with one another optically, and thus are coupled to one another in the daisy chain configuration of FIG. 1 by a plurality of fiber optic cables 8. In particular, as seen in FIG. 1, master module 4 has two optical data outputs, DataOut and ClkOut, and two optical data inputs, DataIn and ClkIn. Similarly, each slave module 6 has two optical data outputs, DataOut and ClkOut, and two optical data inputs, DataIn and ClkIn. As seen in FIG. 1, the DataOut and ClkOut of master module 4 are coupled to the DataIn and ClkIn, respectively, of slave module 6A by fiber optic cables 8A and 8B, the DataOut and ClkOut of slave module 6A are coupled to the DataIn and ClkIn, respectively, of slave module 6B by fiber optic cables 8D and 8C, the DataOut and ClkOut of slave module 6B are coupled to the DataIn and ClkIn, respectively, of slave module 6C by fiber optic cables 8F and 8E, and the DataOut and ClkOut of slave module 6C are coupled to the DataIn and ClkIn, respectively, of master module 4 by fiber optic cables 8H and 8G.

Figure 2:
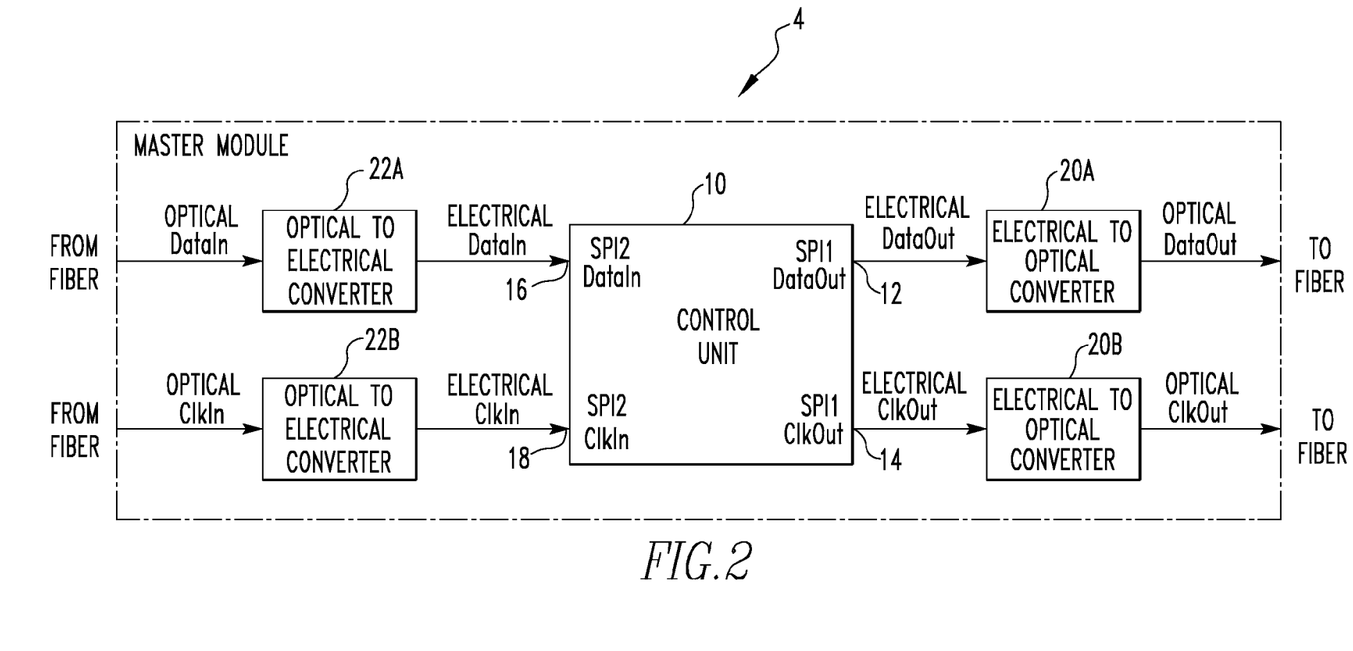
FIG. 2 is a schematic diagram of master module forming part of the electronic system of FIG. 1 according to an exemplary embodiment.

Referring now to FIG. 2, the structure of master module 4 according to the exemplary embodiment will be described. Master module 4 comprises one or more printed circuit board having a number of components provided thereon. More specifically, master module 4 includes a control unit 10, such as, without limitation, a microprocessor, a microcontroller, a field programmable gate array (FPGA), or some other suitable processing device. Control unit 10 includes two SPI interfaces, SPI1 and SPI2. SPI1 is configured to operate in master mode and includes an SPI1 DataOut output (e.g., a pin/line) 12 and an SPI1 ClkOut output (e.g., a pin/line) 14. As described in detail elsewhere herein, control unit 10 is structured to generate a master data signal and a master clock signal and output those signals on SPI1 DataOut output 12 and SPI1 ClkOut output 14, respectively. SPI2 is configured to operate in slave mode and includes an SPI2 DataIn input (e.g., a pin/line) 16 and an SPI2 ClkIn input (e.g., a pin/line) 18. As also described in detail elsewhere herein, control unit 10 is structured to receive a data signal and a clock signal from slave module 6C on SPI2 DataIn input 16 and SPI2 ClkIn input 18, respectively.

Master module 4 further includes two electrical to optical (E/O) converters 20A, 20B. As seen in FIG. 2, E/O converter 20A receives the master data signal in electrical form ("Electrical DataOut") and converts it to optical form ("Optical DataOut"). That optical signal is transmitted on fiber optic cable 8A (FIG. 1). Similarly, E/O converter 20B receives the master clock signal in electrical form ("Electrical ClkOut") and converts it to optical form ("Optical ClkOut"). That optical signal is transmitted on fiber optic cable 8B (FIG. 1).

Master module 4 also includes two optical to electrical (O/E) converters 22A, 22B. As seen in FIG. 2, O/E converter 22A receives the data signal from slave module 6C in optical form ("Optical DataIn") through fiber optic cable 8H, converts it to electrical form ("Electrical DataIn") and provides it to SPI2 DataIn input 16. Similarly, O/E converter 22B receives the clock signal from slave module 6C in optical form ("Optical ClkIn") through fiber optic cable 8G, converts it to electrical form ("Electrical ClkIn") and provides it to SPI2 ClkIn input 18.

Figure 3:
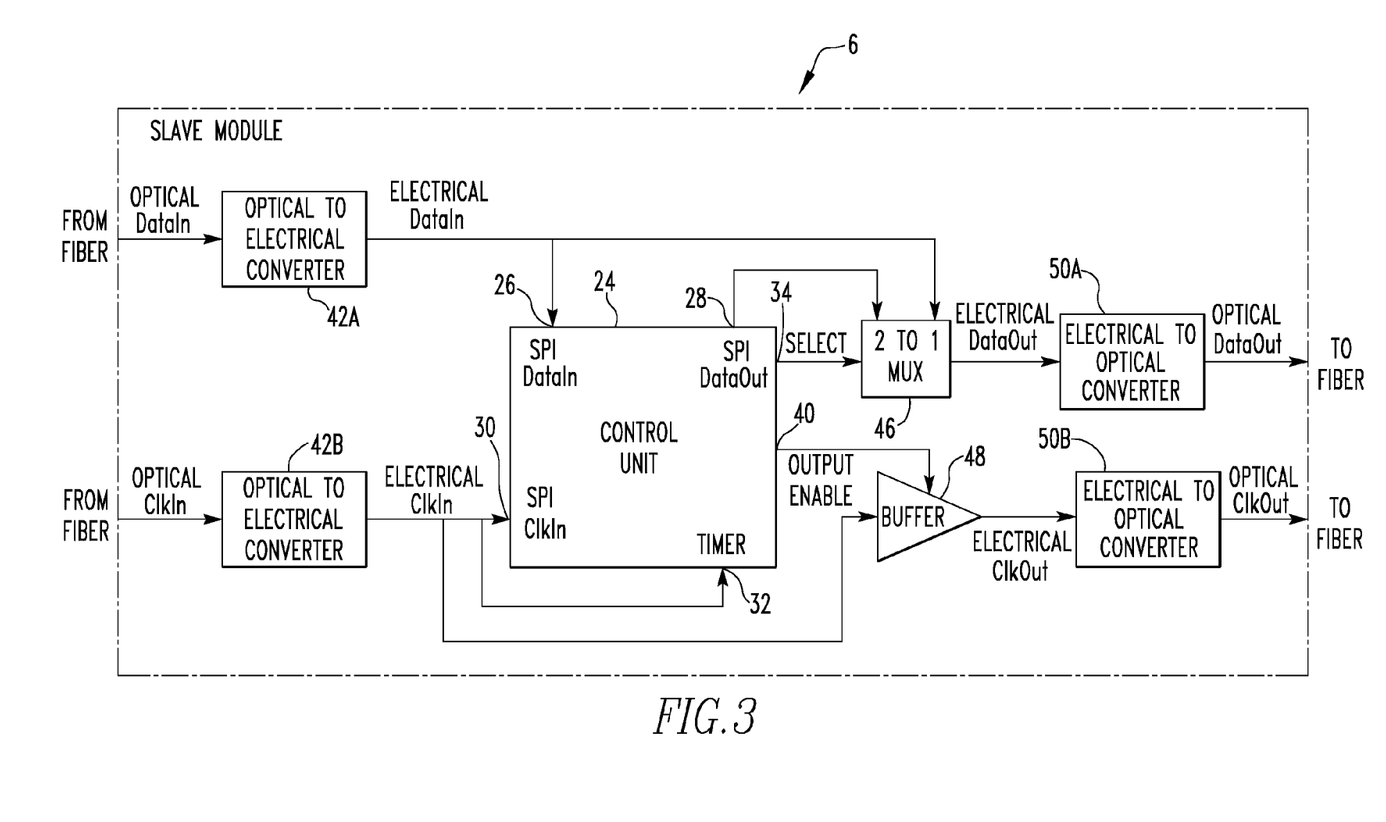
FIG. 3 is a schematic diagram of slave module forming part of the electronic system of FIG. 1 according to an exemplary embodiment.

Referring now to FIG. 3, the structure of slave module 6 (e.g., 6A, 6B and 6C) according to the exemplary embodiment will be described. Slave module 6, like master module 4, in the exemplary, non-limiting embodiment comprises one or more printed circuit boards having a number of components provided thereon. More specifically, slave module 6 includes a control unit 24, such as, without limitation, a microprocessor, a microcontroller, an FPGA, or some other suitable processing device. Control unit 24 includes an SPI interface that is configured to operate in slave mode. That SPI interface includes an SPI DataIn input (e.g., a pin/line) 26, an SPI DataOut output (e.g., a pin/line) 28, and an SPI ClkIn input (e.g., a pin/line) 30. Control unit 24 further includes a timer input 32 to an internal timer, a multiplexer select output 34, and a buffer output enable output 40, the purposes of which are each described below.

Slave module 6 also includes an O/E converter 42A that receives an optical data signal ("Optical DataIn") that is received on the optical data input ("DataIn") of the slave module 6 and converts that optical signal into an electrical signal ("Electrical DataIn"). Slave module 6 further includes a second O/E converter 42B that receives an optical clock signal ("Optical ClkIn") that is received on the optical clock input ("ClkIn") of the slave module 6 and converts that optical signal into an electrical signal ("Electrical ClkIn").

Figure 6:
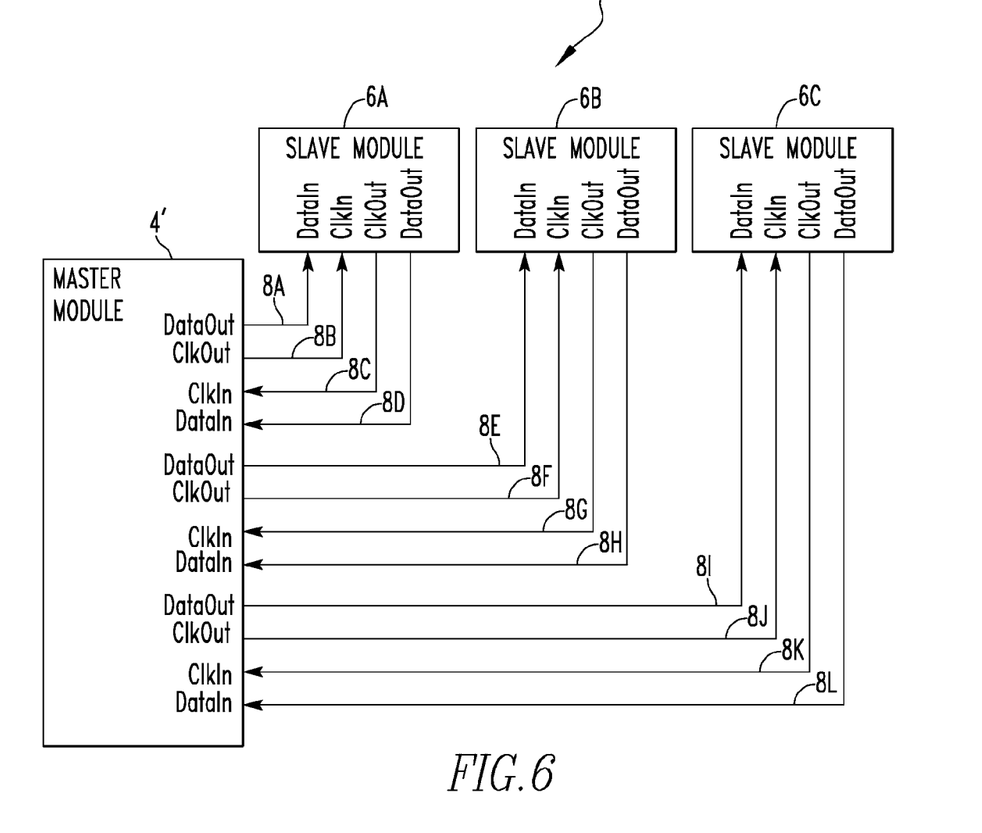
FIG. 6 is a schematic diagram of an electronic system that implements a communications architecture of the present invention according to an alternative particular, non-limiting exemplary embodiment.

In addition, as seen in FIG. 6, slave module 6 includes a 2-to-1 multiplexer (MUX) 46 and an enabled buffer 48. The function of each of these components is described in detail below.

As seen in FIG. 3, the Electrical DataIn signal is provided to both SPI DataIn input 26 of control unit 24 and to the first input of MUX 46. The second input of MUX 46 is coupled to SPI DataOut output 28 of control unit 24. Further, multiplexer select output 34 of control unit 24 is provided to the select input of MUX 46 so that control unit 24 can determine/select which of the two MUX inputs (Electrical DataIn or SPI DataOut) is output by MUX 46 as the "Electrical DataOut" signal.

As also seen in FIG. 3, the Electrical ClkIn signal is provided to three places, namely SPI ClkIn input 30 of control unit 24, timer input 32 of control unit 24, and to the first input of buffer 48. If buffer output enable output 40 of control unit 24 is made active, the Electrical ClkIn signal will be output by buffer 48. If multiplexer output enable output 40 of control unit 24 is made inactive, buffer 48 will be caused to output a predetermined logic state, which is a logic high in the exemplary embodiment. The purpose of this is described elsewhere herein.

Finally, slave module 6 further includes two electrical to optical (E/O) converters 50A, 50B. As seen in FIG. 3, E/O converter 50A receives the Electrical DataOut signal and converts it to optical form ("Optical DataOut"). That optical signal is transmitted on the associated fiber optic cable 8D, 8F, or 8H shown in FIG. 1. Similarly, E/O converter 50B receives the Electrical ClkOut signal and converts it to optical form ("Optical ClkOut"). That optical signal is transmitted on the associated fiber optic cable 8C, 8E, or 8G shown in FIG. 1.

As noted elsewhere herein, master module 4 generates both command data signals/messages and a system clock signal. In the exemplary embodiment, two different data frames are sent by master module 4: one for master commands from master module 4, and one for slave feedback from a selected slave module 6. The master commands are information from master module 4 to provide the slave modules 6 with the needed information to continue operating (example would be modulation depths for a multilevel drive system). The slave section is where a selected slave module 6 will transmit feedback data back to master module 4 (example would be current and voltage measurements). The particular selected slave module 6 is selected by master module 4 in the previous command data message as a transmitted ID number. This ID system prevents multiple slave modules 6 from attempting to access the broadcast domain of electronic system 2 at the same time.

Figure 4:
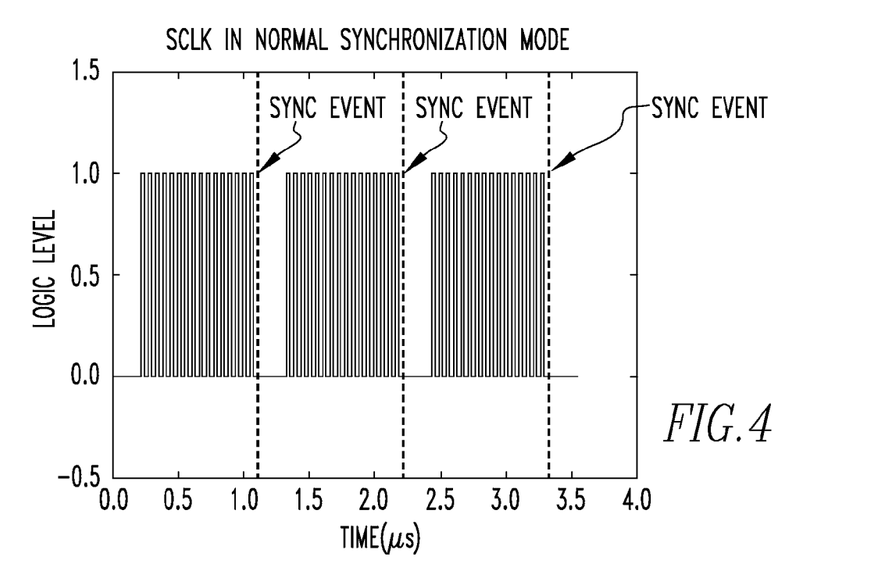
FIG. 4 shows an oscillating clock signal employed in a discontinuous SPI scheme as may be used to implement the present invention.

In addition, as also noted elsewhere herein, in the exemplary embodiment, electronic system 2 employs a discontinuous SPI scheme. As is known in the art, in a discontinuous SPI scheme, master module 4 is programmed to stop transmitting the system clock oscillating signal for short amounts of time between messages. This will appear as a logic low gap in the system clock signal as shown in FIG. 4. Furthermore, in this scheme, control unit 24 of each slave module 6 is programmed to, in the event that a fault condition is detected on slave module 6, pull the system clock signal high and transmit that logic high signal rather than the system signal it received to indicate a fault to the other slave modules 6. This is done by making the buffer output enable output 40 of the control unit 24 inactive. The control unit 24 of that slave module 6 will also then enter a predetermined safe operating mode. Each other slave module 6 will continuously monitor the system clock signal it receives on its optical ClkIn input and look for gaps in the oscillating signal using the timer input 32. If a gap is detected, the logic level is measured to determine whether the gap is a synch signal or a fault signal. If a fault signal, the control unit 24 of that slave module 6 will enter a safe operating mode. In addition, control unit 10 of master module 4 is programmed to, in the event that a fault condition is detected on master module 4, pull the system clock signal high and transmit that logic high signal rather than the normal system clock signal to indicate a fault to the slave modules 6. Master module 4 and the slave modules 6 will then enter a safe operating mode (the slave modules 6 will do so upon receipt of the logic high signal as described elsewhere herein).

Operation of electronic system 2 will now be described in detail in connection with the particular exemplary embodiments of FIGS. 2 and 3. First, operation of electronic system 2 will be described assuming that no faults in electronic system 2 have occurred. This will enable normal operation of electronic system 2 to be understood, including the flow of data and clock signals within electronic system 2. Thereafter, operation of electronic system 2 in the event of a fault condition in one of the modules will be described.

When master module 4 needs to send a message to all slave modules 6A, 6B, 6C, it will generate a master command signal broadcast. None of the slave modules 6A, 6B, 6C will have the permission to modify the data signal of the signal as it is being transmitted ensuring that all modules downstream receive an accurate master command message. When master module 4 needs to communicate with a selected one of the slave modules 6A, 6B, 6C, it will address the ID number of the selected one of slave modules 6A, 6B, 6C in the broadcast signal, and that broadcast signal will be transmitted on the broadcast domain of electronic system 2 to each of the slave modules 6A, 6B, 6C. More specifically, that signal is output via SPI1 DataOut output 12 of control unit 10 as Optical DataOut in FIG. 2 and is provided to slave module 6A (over fiber optic cable 8A). At the same time, master module 4 generates the system clock signal (see FIG. 4) that is output via SPI1 ClkOut output 14 as Optical ClkOut in FIG. 2 and is provided to slave module 6A (over fiber optic cable 8B). In slave module 6A, control unit 24 will receive the command data signal/message in SPI DataIn input 26 (as "Electrical DataIn"—see FIG. 3) and the system clock signal in SPI ClkIn input 30 (as "Electrical ClkIn"—see FIG. 3) in the manner described elsewhere herein. Control unit 24 will examine the command data signal/message to determine whether it includes its ID number. If control unit 24 of slave module 6A determines that the command data signal/message includes its ID number, it then knows that the next data message that will be sent by master module 4 will be intended for it and that it has permission to modify it and transmit its own data back to master module 4. If, however, control unit 24 of slave module 6A determines that the command data signal/message does not includes its ID number, it then knows that the next data message that will be sent by master module 4 will not intended for it and that therefore it may just pass that message along in the daisy chain. In addition, control unit 24 of slave module 6A will also set multiplexer select output 34 so that Electrical DataIn is output by MUX 46, thereby passing the command data signal/message to the next slave module 6 (6B in the present example). Also, because there is no fault condition (see assumption above), control unit 24 of slave module 6A will ensure that buffer output enable output 40 thereof is in an active state. This will cause the Electrical ClkIn signal to be passed to the next slave module 6 (6B in the present example). As will be appreciated, this process will be repeated in each of the remaining slave modules 6, with the end result being that one of the slave modules 6A, 6B, 6C will know that it is the target of the next data message and has permission to transmit its own data.

Next, master module 4 will generate the command data signal/message for the selected one of the slave modules 6A, 6B, 6C. That command data signal/message will be communicated to each of the slave modules 6A, 6B, 6C in the daisy chain in the manner described above. As will be appreciated, the non-selected slave modules 6 (as determined by the prior message containing the ID of the selected slave module 6) will simply pass the command data signal/message to the next slave module 6 by ensuring that the multiplexer select output 34 is set so that Electrical DataIn is output by MUX 46. However, in the selected slave module 6, the control unit 24 will execute the commanded operation specified in the received command data signal/message and transmit data back to master module 4 in the slave section of the data frame. In particular, control unit 24 will create a message with the needed data (in the slave portion of the data frame as described elsewhere herein) and will output that data on SPI DataOut output 28. Also, multiplexer select output 34 of control unit 24 of the selected slave module 6 will be set so that the data on SPI DataOut output 28 will be output by be MUX 46, passed to the next slave module 6 in the daisy chain (if any) as Optical DataOut and ultimately on to the master module 4 (as will be appreciated, the remaining slave modules 6 will simply pass the data signal including the added slave data along without change). Thus, in electronic system 2, data is able to be selectively transmitted to and received from selected slave modules 6, along with the needed system synchronization information, in a broadcast domain provide by multiple optical connections.

Operation of electronic system 2 in the event of a fault will now be described. As noted elsewhere herein, in each slave module 6, the Electrical ClkIn signal is provided to SPI ClkIn input 30 of control unit 24 and to the first input of buffer 48. As noted elsewhere herein, the Electrical ClkIn signal will be output by buffer 48 when buffer output enable output 40 of control unit 24, which is provided to the output enable input of buffer 48, is active. The state just described is the state of control unit 24 if no fault is detected on slave module 6. However, control unit 24 is programmed to constantly monitor slave module 6 for fault conditions. In the event that control unit 24 detects a fault condition, it will do two things. First, it will cause slave module 6 to enter a predetermined safe (i.e., fault detected) state/condition. In addition, it will cause buffer output enable output 40 of control unit 24 to become inactive, which in turn will cause buffer 48 to output a predetermined logic state (which is logic high in the exemplary embodiment) as the Electrical ClkOut signal (see FIG. 5), which is then transmitted through the daisy chain of electronic system 2. In addition, when the master module 4 receives Electrical ClkIn signal in such a logic high state (detected in the manner described below via an internal timer of control unit 10), it will alter the system clock signal output on SPI1 ClkOut output 14 to also be in a logic high state. As will be appreciated, this will ensure that the system clock in the logic high state will make its way to each of the slave modules 6 in the daisy chain (for example, if slave module 6B was the module that first detected the fault, this will ensure that the fault indicating system clock in the logic high state will make its way to slave module 6A).

Figure 5:
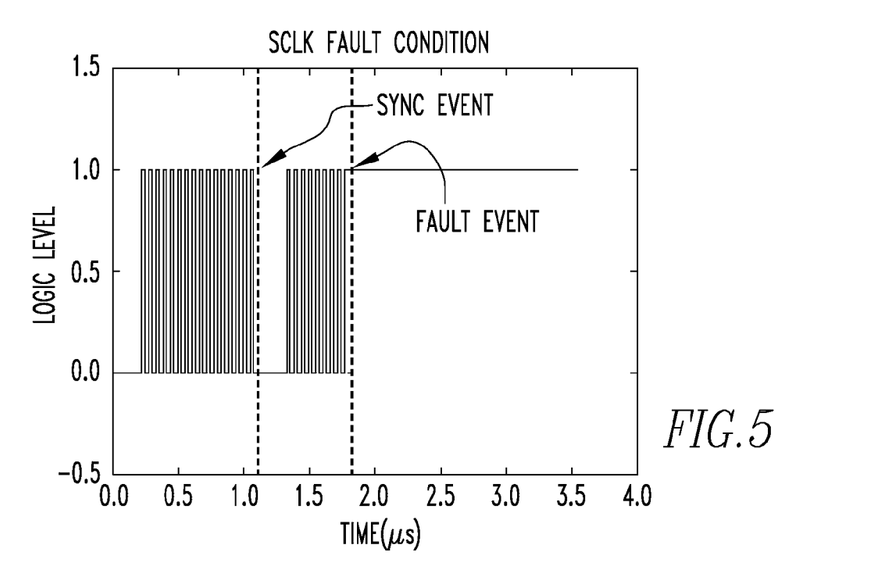
FIG. 5 shows a modified oscillating clock signal employed in the present invention to indicate faults.

The latter events just described enable the other modules (master module 4 and slave modules 6 that did not themselves detect the fault) to also become aware of the fault and enter a predetermined safe (i.e., fault detected) state/condition. In particular, as described elsewhere herein, electronic system 2 employs a discontinuous SPI scheme wherein master module 4 is programmed to stop transmitting the system clock oscillating signal for short amounts of time between messages, which appears as a logic low gap in the system clock signal as shown in FIG. 4. In addition, as just described, when a fault is detected by a slave module 6, the clock signal that is transmitted down the daisy chain of electronic system 2 will have a logic high state (FIG. 5). According to an aspect of the exemplary embodiment of the present invention, control unit 24 in each slave module 6 is programmed to detect and classify both the logic low gaps in the clock signal indicating a synch event and the logic high conditions that indicate a fault. In particular, as noted elsewhere herein, in each slave module 6, the Electrical ClkIn signal is also provided to timer input 32 of control unit 24. Control unit 24 in each slave module 6 is programmed to reset the internal timer each time the Electrical ClkIn signal changes state. If the timer reaches a certain level without being reset, control unit 24 will detect that as a gap, and, based on the logic level of the gap, will be able to classify it as either a synch event (logic low) or a fault event (logic high) and take the appropriate action. Thus, electronic system 2 incorporates enhanced functionality into the system clock signal such that both timing synchronization and fast board to board fault communication are provided in the broadcast domain by multiple optical connections.

Moreover, as described herein, each slave module 6 must receive and retransmit the optical signals down the daisy chain. Each retransmission adds propagation delay to the message leading to delays between when each module receives the signal. If uniform propagation delays are assumed for each module, this error can be compensated. In particular, control unit 10 of master module 4 can measure the time between sending a message on the SPI1 DataOut output 12 and receiving it after the daisy chain on the SPI2 DataIn input 16, which time measurement provides the information needed to calculate a correction factor to apply to each slave module 6.

As noted elsewhere herein, in one particular embodiment, electronic system 2 comprises a power conversion module/system (e.g., a multilevel power inverter or a an active front end) forming a part of a variable speed motor drive. In such an implementation, master module 4 is the main controller which hosts the motor control/AFE loops, and auxiliary systems control (e.g., breaker sequencing, cooling systems, etc.). Any breaker trips or external signals are monitored by master module 4. In addition, in such an implementation, the slave modules 6 control individual phase legs (one leg contains the power electronics needed to create one phase. The phase leg slave controllers of the slave modules 6 (i.e., control units 24) convert the commands received from the main controller into modulation and pulse timing commands that the power electronics utilize to switch properly. Also, all voltages and currents on that phase leg are monitored by the slave controllers to ensure safe operation (local checking of these parameters lead to faster fault response times). As described in detail herein, any slave controller can trip the entire drive if a fault situation is detected using the fiber link.

FIG. 6 is a schematic diagram of a electronic system 2' that implements a communications architecture of the present invention according to another particular, non-limiting exemplary embodiment. As seen in FIG. 6, electronic system 2' includes an alternative master module 4' that is described in greater detail below. Electronic system 2' also includes a number of slave modules 6, as described in detail elsewhere herein. As seen in FIG. 6, module 4' and slave modules 6 are arranged in a star topology (rather than a daisy chain configuration). In the illustrated, exemplary embodiment, electronic system 2' includes three slave modules 6, labeled 6A, 6B, and 6C. It will be understood, however, that this is meant to be exemplary only, and that electronic system 2' may include one, two or four or more slave modules 6 within the scope of the present invention.

Figure 7:
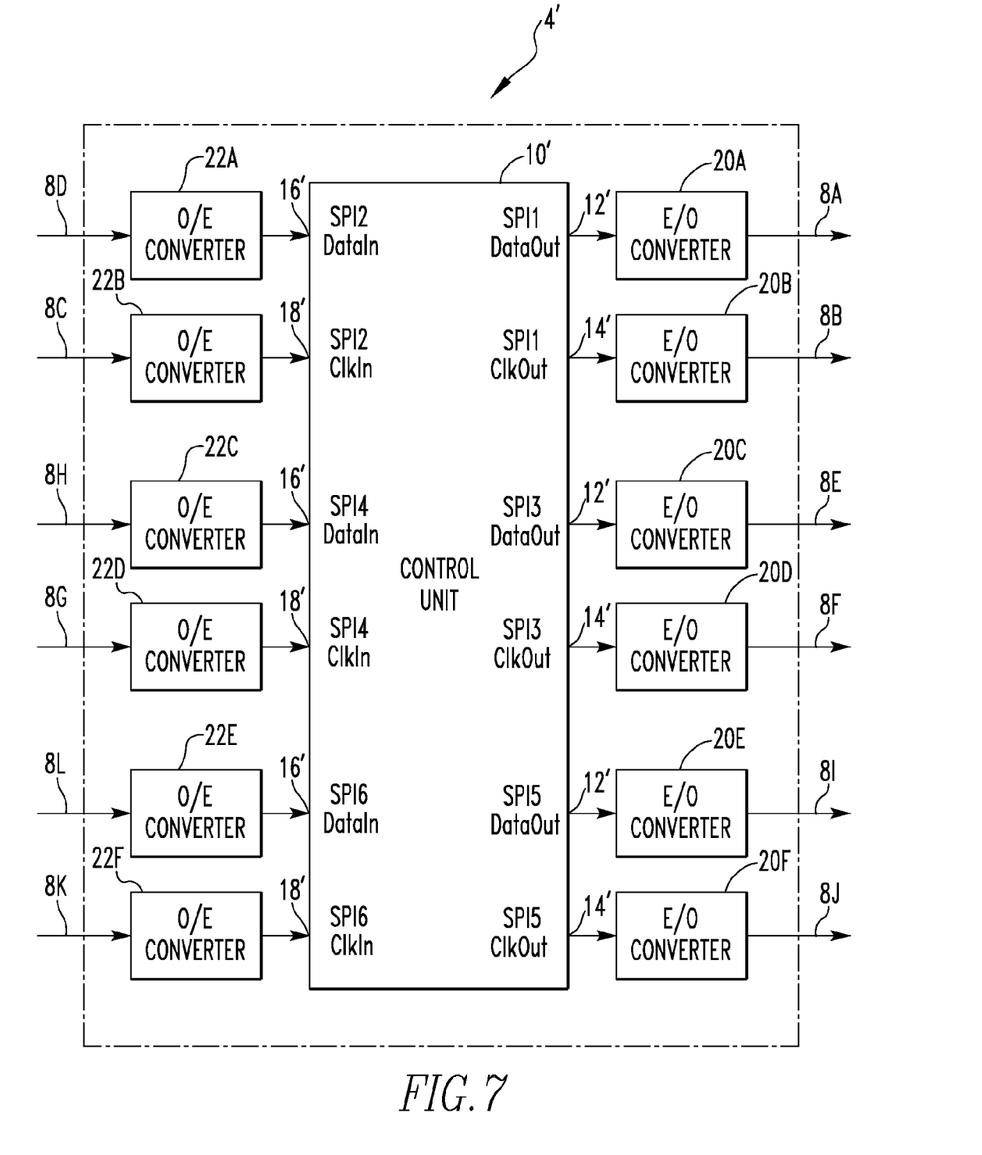
FIG. 7 is a schematic diagram of master module forming part of the electronic system of FIG. 6 according to an exemplary embodiment.

In addition, master module 4' and slave modules 6A, 6B, and 6C are configured to communicate with one another optically, and thus are coupled to one another in the star topology of FIG. 6 by a plurality of fiber optic cables 8, labeled 8A-8L. This ensures that the propagation delay experienced by each slave module 6 will be the same, providing the best synchronization possible. The tradeoff is the number of fiber optic transceiver elements (E/O converters and O/E converters) needed by master module 4'. In particular, as seen in FIG. 7, which is a schematic diagram of master module 4' according to the exemplary embodiment, master module 4' includes an alternative control unit 10', such as, without limitation, a microprocessor, a microcontroller, FPGA, or some other suitable processing device. Control unit 10' is similar to control unit 10 (FIG. 2) described elsewhere herein, except that control unit 10' includes six SPI interfaces, SPI1-SPI6 (as compared to the two SPI interfaces employed by control unit 10). SPI1, SPI3 and SPI5 are each configured to operate in master mode and include SPI1 DataOut, SPI3 DataOut and SPI5 DataOut outputs 12' and SPI1 ClkOut, SPI3 ClkOut and SPI5 ClkOut outputs 14'. Control unit 10' is structured to generate a master data signal and a master clock signal and output those signals on SPI1 DataOut, SPI3 DataOut and SPI5 DataOut outputs 12' and SPI1 ClkOut, SPI3 ClkOut and SPI5 ClkOut outputs 14', respectively, to be simultaneously received by slave modules 6A, 6B, and 6C. In addition, SPI2, SPI4 and SPI6 are each configured to operate in slave mode and include SPI2 DataIn, SPI4 DataIn and SPI6 DataIn inputs 16' and SPI2 ClkIn, SPI4 ClkIn and SPI6 ClkIn inputs 18'. Control unit 10' is thus structured to receive a data signal and a clock signal from slave module 6A on SPI2 DataIn input 16' and SPI2 ClkIn input 18', respectively, a data signal and a clock signal from slave module 6B on SPI4 DataIn input 16' and SPI4 ClkIn input 18', respectively, and a data signal and a clock signal from slave module 6C on SPI6 DataIn input 16' and SPI6 ClkIn input 18', respectively.

In order to perform the communications just described, which require electrical to optical and optical to electrical conversions, master module 4' includes six E/O converters (20A-20F) and six O/E converters (22A-22F) coupled as shown in FIG. 7.

Furthermore, electronic system 2', like electronic system 2, employs a discontinuous SPI scheme wherein master module 4' is programmed to stop transmitting the system clock oscillating signals for short amounts of time between messages. In addition, when a fault is detected by a slave module 6, the clock signal that is transmitted back to the master module 4' through the star topology (as just described) by the fault detecting slave module 6 will have a logic high state (FIG. 5) (as noted elsewhere herein, the fault detecting slave module 6 will also enter a safe state). In response to receipt of the logic high clock signal, master module 4' will transmit a similar logic high clock signal to the other, non fault-detecting slave modules 6 through the star topology (as just described) so that they can enter a safe state as described elsewhere herein.

In a further alternative embodiment, an enhancement of the star topology of FIG. 6 comes from taking advantage of the reduced propagation delay in the system. If the delay is small enough, the feedback clock fiber from the slave modules 6 back to the master module 4' could be eliminated as the clock reference is already available to the master module 4'. In other words, the master module 4' could operate using one SPI interface in full duplex mode for each slave module 6 instead of two SPI interfaces for each slave module 6 (as in FIG. 6) with Tx or Rx only functionality. This is shown schematically in FIGS. 8 and 9.

Figure 8:
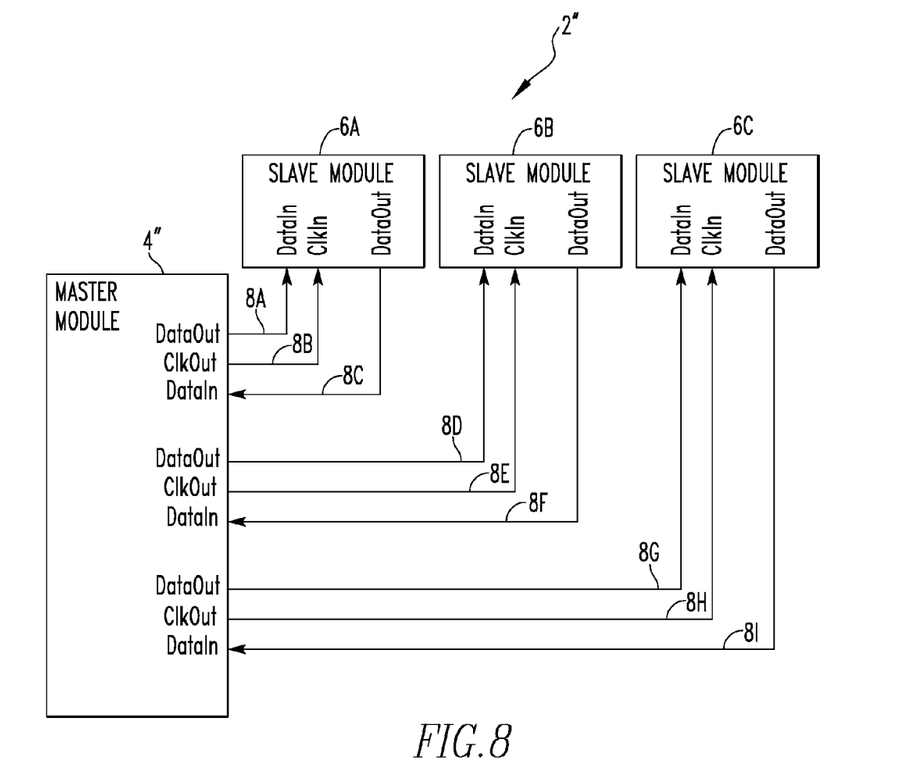
FIG. 8 is a schematic diagram of an electronic system that implements a communications architecture of the present invention according to another alternative particular, non-limiting exemplary embodiment.

In particular, FIG. 8 is a schematic diagram of a electronic system 2" that implements the communications architecture of the present invention according to still another particular, non-limiting exemplary embodiment in the manner just described. As seen in FIG. 8, electronic system 2" includes an alternative master module 4" that is described in greater detail below. Electronic system 2" also includes a number of slave modules 6, as described in detail elsewhere herein, wherein the clock output signals thereof are not utilized. As seen in FIG. 8, module 4" and slave modules 6 are arranged in a star topology. In the illustrated, exemplary embodiment, electronic system 2" includes three slave modules 6, labeled 6A, 6B, and 6C. It will be understood, however, that this is meant to be exemplary only, and that electronic system 2" may include one, two or four or more slave modules 6 within the scope of the present invention.

Figure 9:
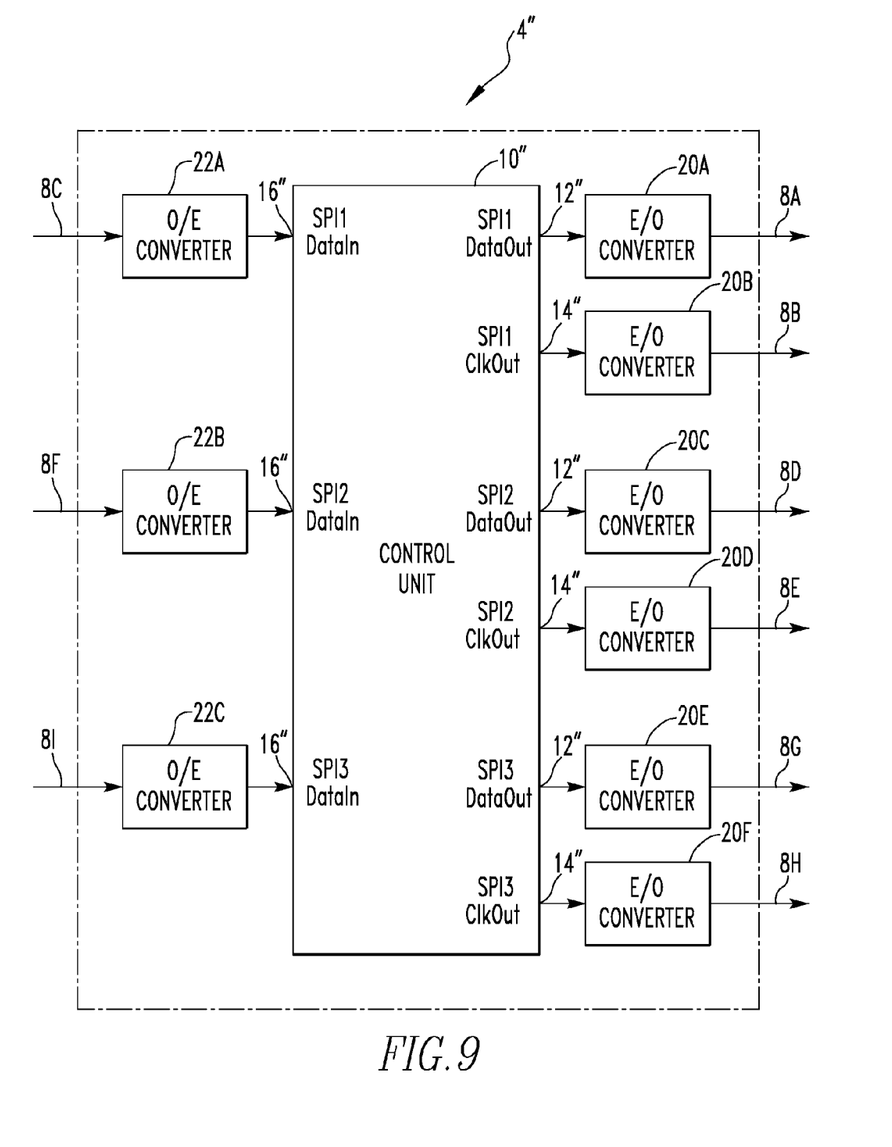
FIG. 9 is a schematic diagram of master module forming part of the electronic system of FIG. 8 according to an exemplary embodiment.

In addition, master module 4" and slave modules 6A, 6B, and 6C are configured to communicate with one another optically, and thus are coupled to one another in the star topology of FIG. 8 by a plurality of fiber optic cables 8, labeled 8A-8I. As was the case with electronic system 2', this ensures that the propagation delay experienced by each slave module 6 will be substantially the same, providing the best synchronization possible. Again, the tradeoff is the number of fiber optic transceiver elements (E/O converters and O/E converters) needed by master module 4". In particular, as seen in FIG. 9, which is a schematic diagram of master module 4" according to the exemplary embodiment, master module 4" includes an alternative control unit 10", such as, without limitation, a microprocessor, a microcontroller, or some other suitable processing device. Control unit 10" is similar to control units 10 and 10' described elsewhere herein, except that control unit 10" includes three SPI interfaces, SPI1-SPI3 operating in full duplex mode. SPI1, SPI2 and SPI3 are each configured to operate in master mode and include SPI1 DataOut, SPI2 DataOut and SPI3 DataOut outputs 12" and SPI1 ClkOut, SPI2 ClkOut and SPI3 ClkOut outputs 14". Control unit 10" is structured to generate a master data signal and a master clock signal and output those signals on SPI1 DataOut, SPI2 DataOut and SPI3 DataOut outputs 12" and SPI1 ClkOut, SPI2 ClkOut and SPI3 ClkOut outputs 14", respectively, to be simultaneously received by slave modules 6A, 6B, and 6C. In addition, SPI1, SPI2 and SPI3 each further include SPI1 DataIn, SPI2 DataIn and SPI3 DataIn inputs 16". Control unit 10" is thus structured to receive a data signal from slave module 6A on SPI1 DataIn input 16", a data signal from slave module 6B on SPI2 DataIn input 16" and a data signal from slave module 6C on SPI3 DataIn input.

In order to perform the communications just described, which require electrical to optical and optical to electrical conversions, master module 4" includes six E/O converters (20A-20F) and three O/E converters (22A-22C) coupled as shown in FIG. 7. In addition, as will be appreciated, since the feedback clock fiber from the slave modules 6 back to the master module 4" is eliminated, the embodiment of FIGS. 8 and 9 does not employ the fault detection and communication scheme that is described elsewhere herein. However, the synchronization and rest of the communication parameters described herein still apply. In other words, the only functionality lost when removing the feedback clock fiber is the ability of the slave modules to notify the master module that a fault has occurred. All other communication details will still work, including synchronization.

Figure 10:
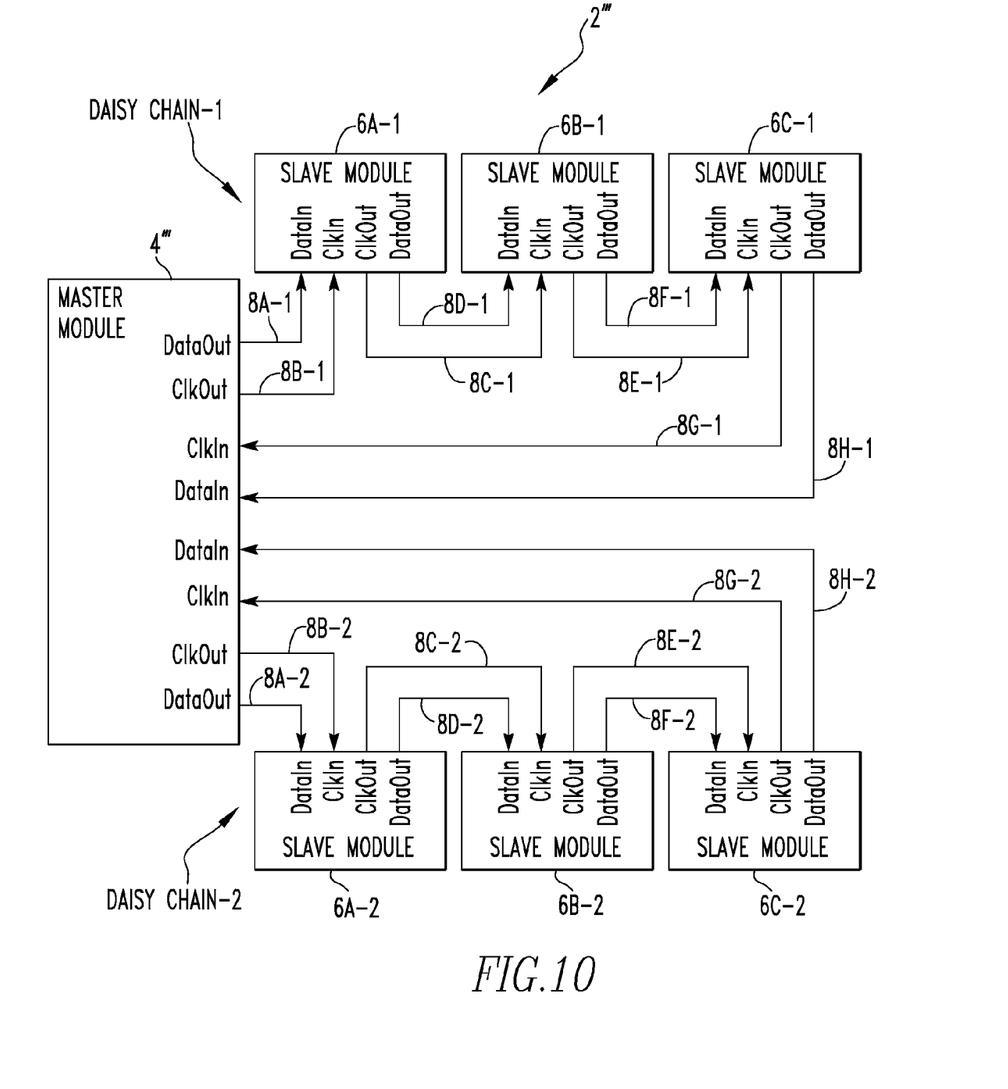
FIG. 10 is a schematic diagram of an electronic system that implements a communications architecture of the present invention according to still another alternative particular, non-limiting exemplary embodiment.

FIG. 10 is a schematic diagram of an electronic system 2''' that implements the communications architecture of the present invention according to another particular, non-limiting exemplary embodiment employing a combination of a star and a daisy chain topology. With this topology, multiple daisy chains can be created from one master module 4'''. In the exemplary, illustrated embodiment shown in FIG. 10, two such daisy chains have three slave modules each are shown. It will be understood, however, that that is meant to be exemplary only and that more than two daisy chains (i.e., N≧3 (e.g., 3 or 8 daisy chains)) each having two or more slave modules (i.e., M≧2 (e.g., 9 or more slave modules)) are contemplated within the scope of the present invention. Referring again to FIG. 10, the daisy chains of that exemplary embodiment are designated "Daisy Chain-1" and "Daisy Chain-2", with each one operating as described herein in connection with FIG. 1. Master module 4''' is very similar to master module 4, except that it has double the inputs and outputs so that it can handle the double daisy chain configuration. More specifically, master module 4''' includes a control unit that includes four SPI interfaces, SPI1-SPI4. SPI1 and SPI3 are each configured to operate in master mode (like SPI1 in FIG. 1) and are used to generate master data signals and master clock signals that are output to "Daisy Chain-1" and "Daisy Chain-2", respectively. SPI2 and SPI4 are configured to operate in slave mode (like SPI2 in FIG. 1) and are structured to receive a data signal and a clock signal from the slave module 6C (i.e., 6C-1 and 6C-2) of "Daisy Chain-1" and "Daisy Chain-2", respectively.

When master module 4''' sends the exact same data and clock signals to both daisy chains, the position matched module numbers in each daisy chain will see the same propagation delay. For example, slave module 6B-1 will see the message at the same time that slave module 6B-2 does without the need for propagation delay adjustment. This arrangement leads to two design parameters for the communication system enhancing its flexibility and usefulness. Extremely time critical synchronizations should be position matched between multiple daisy chains (e.g., 10s of ns order of magnitude accuracy). Secondary priority synchronizations can be placed on the daisy chain which experience propagation delay to its neighboring modules (e.g., 100s of ns order of magnitude accuracy).

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An electronic system, comprising:
   a master module having a first control unit, the first control unit having one or more first serial interfaces, the first control unit being programmed to output a first data signal and a first clock signal through the one or more first serial interfaces; and
   a slave module having a second control unit, the second control unit having a second serial interface, the slave module receiving the first clock signal through the second serial interface, the second control unit being programmed to monitor the slave module for a fault condition and output a second clock signal through the second serial interface which is (i) the same as the first clock signal if a fault condition on the slave module is not detected, and (ii) a modified clock signal having a predetermined format if a fault condition on the slave module is detected.

2. The electronic system according to claim 1, wherein the second control unit is further programmed to cause the slave module to enter a predetermined safe state responsive to detecting a fault condition on slave module.

3. The electronic system according to claim 1, further comprising an additional slave module having an additional second control unit, the additional second control unit having an additional second serial interface that receives the second clock signal from the slave module.

4. The electronic system according to claim 3, wherein the additional second control unit is programmed to cause the additional slave module to enter a predetermined safe state responsive to determining that the second clock signal is the modified clock signal.

5. The electronic system according to claim 1, wherein the modified clock signal having the predetermined format is a clock signal having a predetermined logic state.

6. The electronic system according to claim 5, wherein the predetermined logic state is a logic high state.

7. The electronic system according to claim 1, wherein the one or more first serial interfaces and the second serial interface are each an SPI interface.

8. The electronic system according to claim 1, wherein the slave module receives the first data signal through the second serial interface, wherein the second control unit is further programmed to (a) determine whether it needs to generate a modified data signal, and (b) output a second data signal through the second serial interface which is: (i) the same as the first data signal if it determines that it does not need to generate the modified data signal, and (ii) the modified data signal if it determines that it does need to generate the modified data signal.

9. The electronic system according to claim 8, further comprising an additional slave module that receives the second data signal from the slave module.

10. The electronic system according to claim 1, wherein the one or more first serial interfaces comprise a first master serial interface and a second master serial interface, wherein the first control unit is programmed to output the first clock signal through the first master serial interface, and wherein the master module receives a slave clock signal through the second master serial interface from either the slave module or an additional slave module that is provided as part of the electronic system.

11. The electronic system according to claim 10, wherein the first control unit is programmed to output the first data signal through the first master serial interface, and wherein the master module receives a slave data signal through the second master serial interface from either the slave module or the additional slave module.

12. The electronic system according to claim 10, wherein the first control unit is further programmed to cause the master module to enter a predetermined safe state responsive to determining that the slave clock signal has the predetermined format.

13. The electronic system according to claim 12, wherein the first control unit is further programmed to output a modified first clock signal having the predetermined format to the slave module through the one or more first serial interfaces responsive to determining that the slave clock signal has the predetermined format.

14. The electronic system according to claim 13, wherein the slave module enters a predetermined safe state responsive to receiving the modified first clock signal.

15. The electronic system according to claim 1, wherein the first control unit is further programmed to output a modified first clock signal having the predetermined format through the one or more first serial interfaces responsive to detecting a fault condition on the master module.

16. The electronic system according to claim 1, wherein the first control unit is further programmed to cause the master module to enter a predetermined safe state responsive to detecting the fault condition on the master module.

17. The electronic system according to claim 1, wherein the one or more first serial interfaces of the master module are directly coupled to the second serial interface of the slave module by a first fiber optic connection comprising a number of optical fibers.

18. The electronic system according to claim 1, further comprising one or more additional slave modules, wherein the master module, the slave module and the one or more additional slave modules are interconnected in a daisy chain configuration to form a plurality of daisy chained modules in the daisy chain configuration, wherein each additional slave module has an additional second control unit, the additional second control unit having an additional second serial interface, wherein each additional slave module receives a respective clock signal through the additional second serial interface from an immediately preceding one of the daisy chained modules in the daisy chain configuration, wherein in each additional slave module the additional second control unit is programmed to monitor the additional slave module for a fault condition and output an additional second clock signal through the additional second serial interface which is (i) the same as the respective clock signal if a fault condition on the additional slave module is not detected, and (ii) a modified clock signal having the predetermined format if a fault condition on the additional slave module is detected, wherein the additional second serial interface of a first one of the one or more additional slave modules in the daisy chain configuration is directly coupled to the second serial interface of the slave module, and wherein the additional second serial interface of a last one of the one or more additional slave modules in the daisy chain is directly coupled to the one or more first serial interfaces of the master module.

19. The electronic system according to claim 18, wherein the master module, the slave module and the one or more additional slave modules are interconnected in the daisy chain configuration by a number of fiber optic connections each having a number of optical fibers.

20. The electronic system according to claim 18, wherein the slave module and the one or more additional slave modules total two in number.

21. The electronic system according to claim 18, wherein the slave module and the one or more additional slave modules total three or more in number.

22. The electronic system according to claim 1, wherein the first control unit of the master module has one or more additional first serial interfaces, wherein the first control unit is programmed to output an additional first data signal and an additional first clock signal through the one or more additional first serial interfaces, the electronic system further comprising an additional slave module, wherein the master module, the slave module and the additional slave module are interconnected in a star topology, wherein the additional slave module has an additional second control unit, the additional second control unit having an additional second serial interface, wherein the additional slave module receives the additional first clock signal through the additional second serial interface, wherein the additional second control unit is programmed to monitor the additional slave module for a fault condition and output an additional second clock signal through the additional second serial interface which is (i) the same as the additional first clock signal if a fault condition on the additional slave module is not detected, and (ii) an additional modified clock signal having the predetermined format if a fault condition on the additional slave module is detected.

23. The electronic system according to claim 22, wherein the one or more first serial interfaces of the master module are directly coupled to the second serial interface of the slave module by a first fiber optic connection comprising a number of optical fibers, and wherein the one or more additional serial interfaces are directly coupled to the additional second serial interface of the additional slave module by a second fiber optic connection comprising a number of optical fibers.

24. The electronic system according to claim 22, wherein the second control unit of the slave module is programmed to output a first slave data signal through the second serial interface to the first control unit of the master module, and wherein the additional second control unit of the additional slave module is programmed to output a second slave data signal through the additional second serial interface to the first control unit of the master module.

25. The electronic system according to claim 22, wherein the first control unit is further programmed to (i) output a modified first clock signal having the predetermined format to the slave module on the one or more first serial interfaces in response to receiving the additional second clock signal in the form of the additional modified clock signal from the additional slave module on the one or more additional serial interfaces, (ii) output a modified additional first clock signal having the predetermined format to the additional slave module on the one or more additional serial interfaces in response to receiving the second clock signal in the form of the modified clock signal from the slave module on the one or more first serial interfaces, and (iii) output the modified first clock signal to the slave module on the one or more first serial interfaces and the modified additional first clock signal to the additional slave module on the one or more additional serial interfaces in response to detecting a fault condition on the master module.

26. The electronic system according to claim 1, wherein the electronic system comprises a power conversion system.

27. The electronic system according to claim 1, wherein the first clock signal has a second predetermined format that is different than the predetermined format and that is configured for providing time based synchronization of the master module and the slave module.

28. The electronic system according to claim 1, wherein the master module has one or more additional first serial interfaces, the first control unit being programmed to output an additional first data signal and an additional first clock signal through the one or more additional first serial interfaces, and wherein the electronic system further includes:
  (i) a second slave module having a third control unit, the third control unit having a third serial interface, the second slave module receiving the additional first clock signal through the third serial interface, the third control unit being programmed to monitor the second slave module for a fault condition and output a third clock signal through the third serial interface which is (i) the same as the additional first clock signal if a fault condition on the second slave module is not detected, and (ii) a second modified clock signal having the predetermined format if a fault condition on the second slave module is detected;
  (ii) one or more first additional slave modules, wherein the master module, the slave module and the one or more first additional slave modules are interconnected in a first daisy chain configuration; and
  (iii) one or more second additional slave modules, wherein the master module, the second slave module and the one or more second additional slave modules are interconnected in a second daisy chain configuration.

29. A method of providing synchronization information and fault detection information in an electronic system, comprising:
  generating a first data signal and a first clock signal in a master module of the electronic system, the master module having one or more first serial interfaces;
  outputting the first data signal and the first clock signal from the master module through the one or more first serial interfaces;
  receiving the first clock signal through a second serial interface of a slave module of the electronic system;
  monitoring the slave module for a fault condition on the slave module; and
  responsive to receiving the clock signal in the slave module, outputting a second clock signal from the slave module through the second serial interface to either the master module or an additional slave module of the electronic system which is (i) the same as the first clock signal if a fault condition on the slave module is not detected, and (ii) a modified clock signal having a predetermined format if a fault condition on the slave module is detected.

30. The method according to claim 29, further comprising causing the slave module to enter a predetermined safe state responsive to detecting a fault condition on the slave module.

31. The method according to claim 29, wherein the modified clock signal is output to the additional slave module, the method further comprising causing the additional slave module to enter a predetermined safe state responsive to receiving the modified clock signal.

32. The method according to claim 31, the method further comprising, responsive to receiving the modified clock signal, causing the additional slave module to output an additional clock signal that is the same as the modified clock signal to either the master module or another additional slave module of the electronic system.

33. The method according to claim 32, wherein the master module, the slave module, and the additional slave module are arranged in a daisy chain configuration.

34. The method according to claim 29, wherein the additional slave module includes an additional second serial interface, wherein the second clock signal in a form that is not the modified clock signal is output to the additional slave module from the slave module, the method further comprising, responsive to receiving the second clock signal, causing the additional slave module to output a third clock signal through the additional second serial interface to either the master module or another additional slave module of the electronic system which is (i) the same as the second clock signal if a fault condition on the additional slave module is not detected, and (ii) an additional modified clock signal having the predetermined format if a fault condition on the additional slave module is detected.

35. The method according to claim 29, wherein the second clock signal is output to the additional slave module by the slave module, the method further comprising receiving a slave clock signal through the one or more first serial interfaces of the master module from either the additional slave module or another additional slave module that is provided as part of the electronic system, and causing the master module to enter a predetermined safe state responsive to determining that the slave clock signal has the predetermined format.

36. The method according to claim 35, further comprising causing the master module to output a modified first clock signal having the predetermined format to the slave module through the one or more first serial interfaces responsive to determining that the slave clock signal has the predetermined format.

37. The method according to claim 36, further comprising causing the slave module to enter a predetermined safe state responsive to receiving the modified first clock signal.

38. The method according to claim 29, further comprising causing the master module to output a modified first clock signal having the predetermined format to the slave module through the one or more first serial interfaces responsive to detecting a fault condition on the master module.

39. The method according to claim 29, wherein the modified clock signal is output from the slave module to the master module, the method further comprising causing the master module to enter a predetermined safe state responsive to receiving the modified clock signal.

40. The method according to claim 39, wherein the master module, the slave module, and an additional slave module are arranged in a star topology, the method further comprising, responsive to receiving the modified clock signal, causing the master module to output a modified first clock signal that is the same as the modified clock signal to the additional slave module.

41. The method according to claim 40, the method further comprising causing the master module to output the modified first clock signal to one or more other additional slave modules of the electronic system in the star topology.

42. The method according to claim 29, wherein the modified clock signal having the predetermined format is a clock signal having a predetermined logic state.

43. The method according to claim 42, wherein the predetermined logic state is a logic high state.

44. The method according to claim 29, wherein the one or more first serial interfaces and the second serial interface are each an SPI interface.

45. The method according to claim 29, wherein the first data signal and the first clock signal are received in the slave module directly from the master module through a first fiber optic connection comprising a number of optical fibers.

46. The method according to claim 45, wherein the outputting the second clock signal through the second serial interface of the slave module to either the master module or an additional slave module of the electronic system is done through a second fiber optic connection comprising a number of optical fibers.

47. The method according to claim 29, further comprising receiving the first data signal through the second serial interface of the slave module, and responsive to receiving the first data signal in the slave module, generating a modified data signal in the slave module and outputting the modified data signal through the second serial interface to either the master module or the additional slave module.

48. The method according to claim 29, further comprising receiving the first data signal through the second serial interface of the slave module, and responsive to receiving the first data signal in the slave module, outputting a second data signal that is the same as the first data signal through the second serial interface to either the master module or the additional slave module.

49. The method according to claim 29, wherein the first clock signal has a second predetermined format that is different than the predetermined format and that is configured for providing time based synchronization of the master module and the slave module, the method further comprising using the first clock signal to provide time based synchronization between the master module and the slave module.

\* \* \* \* \*